Aug. 23, 1927.

J. W. WOODWARD 1,640,138

CONTROLLING APPARATUS FOR COTTON DISTRIBUTING MECHANISMS

Filed Nov. 16, 1923   2 Sheets-Sheet 1

INVENTOR.
John W. Woodward
By
ATTORNEY.

Aug. 23, 1927.
J. W. WOODWARD
1,640,138
CONTROLLING APPARATUS FOR COTTON DISTRIBUTING MECHANISMS
Filed Nov. 16, 1923　　2 Sheets-Sheet 2
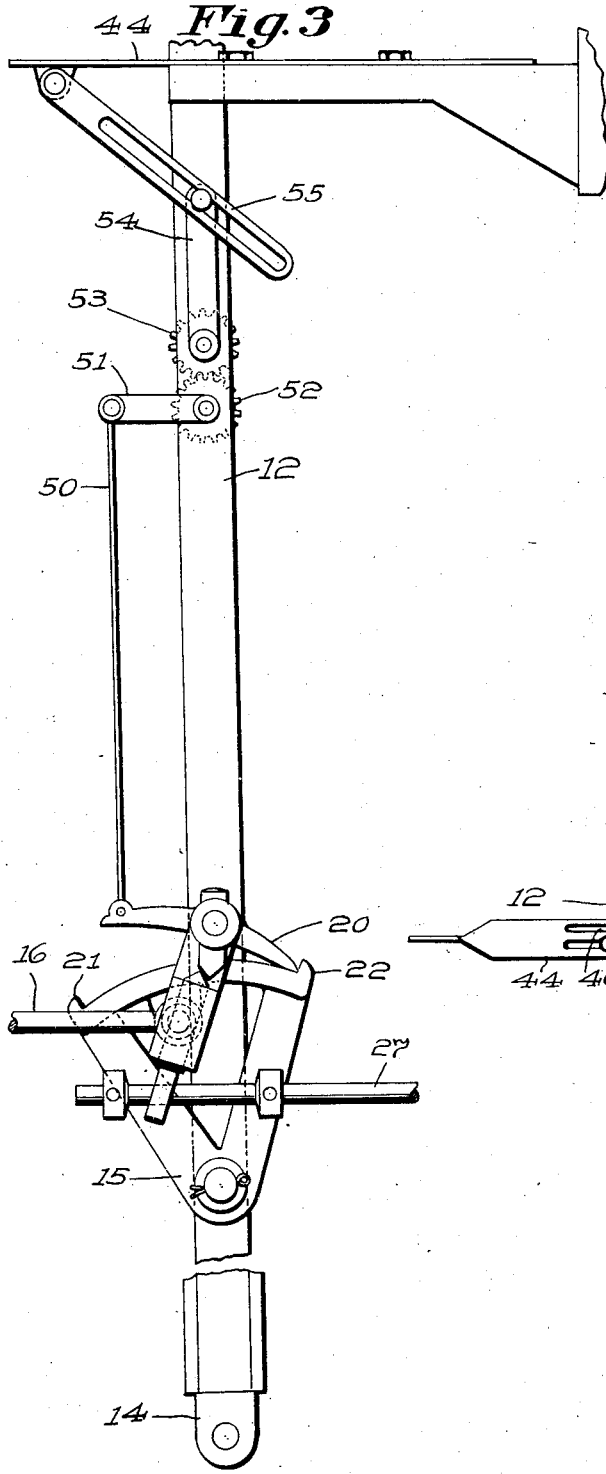
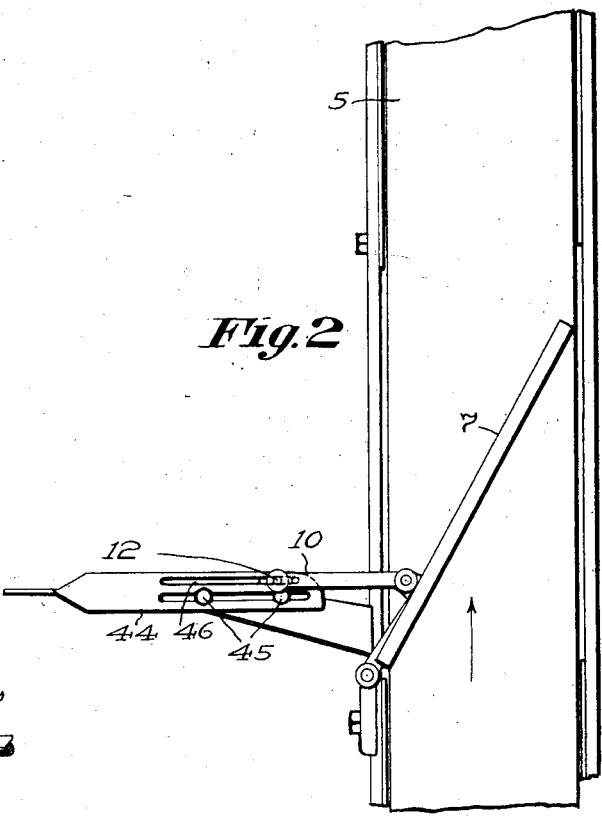
INVENTOR.
John W. Woodward,
J. H. McCurdy,
his ATTORNEY.

Patented Aug. 23, 1927.

1,640,138

UNITED STATES PATENT OFFICE.

JOHN WILLIAM WOODWARD, OF LAWRENCE, MASSACHUSETTS, ASSIGNOR, BY MESNE ASSIGNMENTS, TO KITSON MACHINE SHOP, A CORPORATION OF MASSACHUSETTS.

CONTROLLING APPARATUS FOR COTTON-DISTRIBUTING MECHANISMS.

Application filed November 16, 1923. Serial No. 675,141.

It is now a very common practice in cotton mills to blow cotton from the storehouse or opening room into the picker room and deliver it to a conveyor belt which feeds a line of cotton openers, breaker lappers, or the like. These machines are usually equipped with automatic feeders, and the discharge of the cotton from the conveyor belt into the indivdual feeders is effected by gates which may be moved into or out of position to divert cotton from the belt into the feeder hoppers. The gate for each feeder is under the control of a feeler mounted in the feeder hopper, and the arrangement is such that the gate is moved into its diverting or open position when the supply of cotton in the hopper becomes depleted, and is returned to its closed position again when said supply of cotton has been replenished.

Certain of the machines supplied with cotton in this manner are equipped with mechanism for automatically stopping them under predetermined conditions. For example, a breaker lapper is equipped with mechanism which automatically stops it when the winding of a lap has been completed, and it may happen that the machine will be stopped while the gate is in its open position. The discharge of cotton from the conveyor belt into the feed hopper, therefore, will continue uninterruptedly until the machine is again started and the feeler mechanism operates to effect the closing of the gate. In the meantime the machine is not using cotton, and consequently the hopper is very liable to be filled and overflowed. If the attendant has a large number of machines to care for, a very considerable quantity of cotton may be discharged on the floor before he discovers the condition and rectifies it by manually closing the gate.

It is the chief object of the present invention to improve the controlling apparatus for cotton distributing mechanisms with a view to rendering them more completely automatic, and specifically with a view to avoiding occurrences of the character just described.

The nature of the invention will be readily understood from the following description when read in connection with the accompanying drawings, and the novel features will be particularly pointed out in the appended claims.

In the drawings,

Fig. 2 is a plan view of a part of the controlling mechanism shown in Fig. 1; and Fig. 3 is a side elevation on a larger scale of another part of this controlling mechanism.

Figure 1:
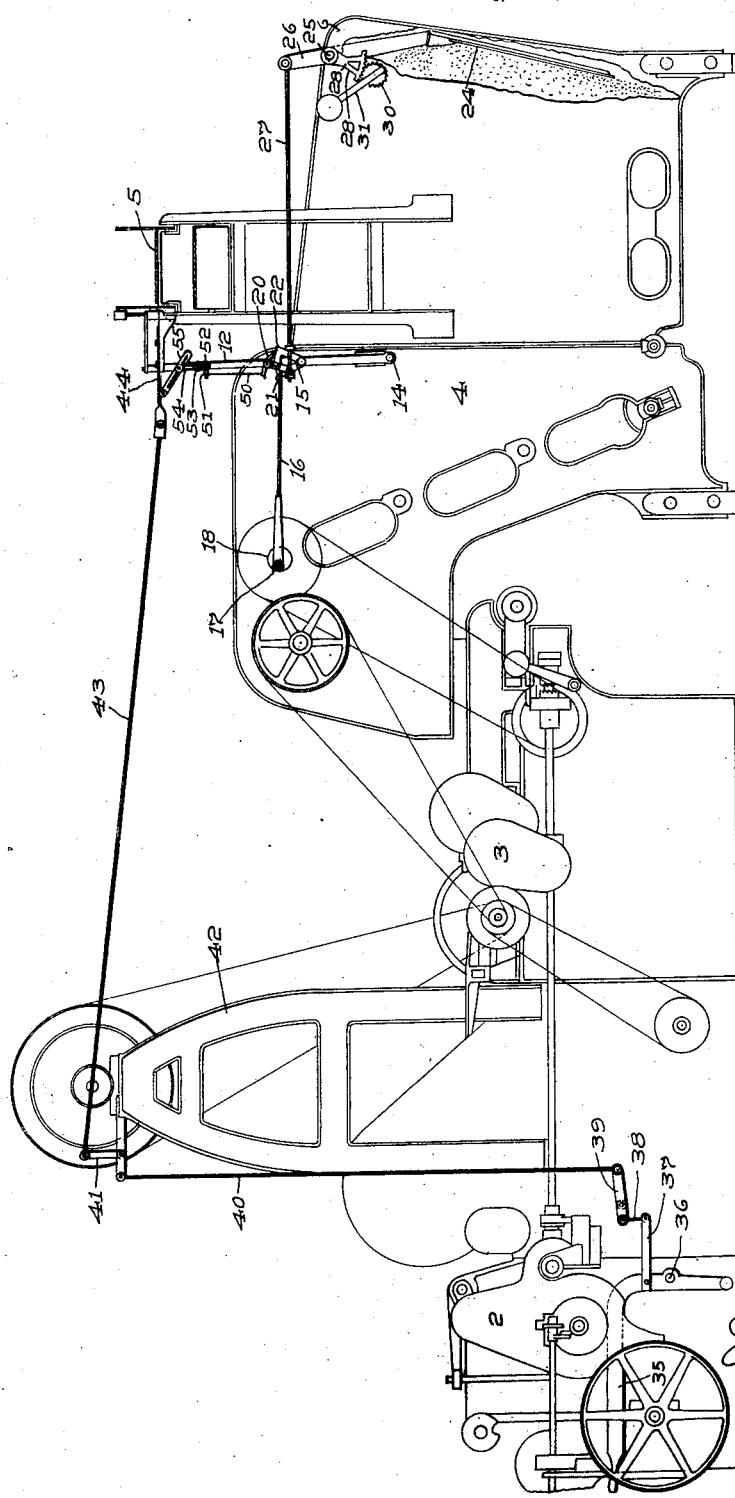
Figure 1 is a side elevation of a lapper with an automatic feeder and beater, this apparatus being equipped with a controlling mechanism embodying the present invention.

The machine shown in the drawings comprises a lapper 2, a beater 3, and a feeder 4, these different units being constructed, organized and connected in the usual manner. This machine operates in line with a series of like machines, the entire series being fed by a conveyor belt 5, as above described. For the purpose of controlling the discharge of cotton from the belt into the hopper 6 of the feeder 4, a gate 7 is pivoted at one side of the conveyor where it can be moved into either an open or closed position. In its open position it projects diagonally across the belt, as indicated in Fig. 2, so that it diverts cotton into the hopper 6; while in its closed position it stands at one side of the conveyor belt. In the latter position the delivery of cotton to the hopper is prevented and the cotton simply travels uninterruptedly along the belt until it is diverted by an open gate.

Movement of the gate from one position to the other is effected by a link 10 which connects the gate with the upper end of a lever 12, pivoted on the hopper frame at 14. Pivoted on this lever is a segment 15 that is constantly reciprocated by a pitman 16 operated from an eccentric pin 17 which projects from a disk 18 that is mounted fast on the end of the drive shaft for one of the feed aprons and is rotated constantly so long as the machine is in operation. A double dog or latch 20 is also pivoted on the lever 12 and is arranged to be moved into engagement with either of the lugs 21 or 22 at the opposite ends of the segment 15. The position of this latch is controlled by a feeler fork 24 mounted in the hopper 6 and supported on a rock shaft 25 which is journaled in the upper part of the hopper. An arm 26, fast on this shaft, is connected by a rod 27 with an arm projecting rigidly from the latch 20. The feeler is urged forward by means of a toothed sector 28 which meshes with a pinion 30 having a weighted arm 31 secured thereto.

This mechanism is exactly like that of the well known Morton distributor. So long as a sufficient quantity of cotton is in the hopper 6 the feeler will be held back, as shown in Fig. 1, and the gate 7 will remain in its closed position. When the supply of cotton in the hopper becomes depleted, the weighted arm 31 will operate through the connections with the feeler 24 to move this feeler forward, and this motion will be transmitted through the connections with the latch 20 to shift this latch so that its left-hand end, Fig. 1, will be engaged by the lug 21 of the constantly reciprocating segment 15. The next forward movement of this segment, therefore, will rock the lever 12 toward the right, Fig. 1, and move the gate 7 into its open position. The parts will remain in this position until the supply of cotton in the hopper 6 has been replenished, at which time the presure of the cotton will force the feeler 24 back into its original position, thus reversing the relationship between the dog 20 and segment 15. The segment will then swing the rod 12 back into its initial position and close the gate.

The lapper 2 is equipped with the usual mechanism for automatically stopping the machine when a lap has been completed, and the driving mechanism for the machine and its feeder are so arranged that when the lapper is stopped the feeding mechanism also is stopped. In fact, the entire machine stops, with the exception of the beater, doffer, condenser fan and combing roll. It may happen, therefore, that the machine will be stopped just after the gate 7 has been opened and while it is diverting cotton into the hopper 6. If the machine is not started up again in a very few minutes the hopper will overflow, as has been described above. The present invention provides a mechanism which prevents an occurrence of this kind.

The stop mechanism for the lapper includes the usual drop bar or lever 35 which is released when the lap is completed, as is well understood by those skilled in this art.

This lever is fulcrumed at 36 and the connections provided by this invention include an arm 37 secured to the lever 36, a link 38 which connects this lever with another lever 39, and a rod 40 connecting the latter lever with a bell crank lever 41, which is fulcrumed on the countershaft stand 42. The rod 43 connects the bell crank 41 with a plate 44 which is mounted to slide on a bracket that projects horizontally from the conveyor frame. This plate is guided on pins 45 which project through a slot formed in the plate, as clearly shown in Fig. 2. The plate also has another slot 46 to receive the gate shifting lever 12, previously referred to.

It will now be evident that when the drop bar 35 is released at the completion of a lap and drops into its lowered position to stop the lapper 2, the movement of this lever will be transmitted through the connections just described to the gate 7 and will close this gate provided it happens to be in its open position when the lapper is stopped. If the gate is closed at this time, the slide plate 44 will simply move idly, due to the presence of the slot 46, and will not produce any movement of the gate 7.

In order to avoid breakage of the connections between the segment 15 and the gate 7, which otherwise would be likely to occur if the gate were closed when the segment was holding it open, a connection has been provided between the slide 44 and the latch 20 for lifting the latch out of its normal relationship to its operating segment. This connection comprises a rod 50, which is pivoted to the latch 20 and connects this latch with an arm 51 secured fast to a pinion 52 which meshes with another pinion 53, both these pinions being supported on the lever 12. An arm 54 is secured to the pinion 53 and carries a pin which runs in a slot formed in another arm 55 that is pivotally connected to the plate or slide 44.

When the gate 7 is in its open position the left-hand end, Fig. 3, of the latch 20 is tipped down and rests in contact with the surface of the segment 15. If the stop mechanism for the lapper is operated at this time to open the gate, as above described, the connections between the plate 44 and the latch 20 will lift the left-hand end of the latch above the path of movement of the lug 21, so that any breakage of the connections between the gate and its operating mechanism will be prevented. These connections thus are rendered inoperative temporarily, but when the machine is again started up the parts will automatically be returned to their normal relationship so that the distributing mechanism will operate exactly as though the mechanism provided by this invention were not present.

It will now be understood that the invention provides a very simple arrangement for preventing the delivery of cotton to the machine when it is not in operation and thus effectually avoids any possibility of the hopper being overflowed. Furthermore, this mechanism does not interfere in any degree with the normal operation of the cotton supplying apparatus or the controlling mechanism therefor, and it is so simple that it can be manufactured very economically and there is practically no liability of its getting out of order.

While I have herein shown and described the best embodiment of my invention that I have so far devised, it will be understood that the invention may be embodied in other forms without departing from the spirit or scope thereof. It will also be evident that while the apparatus shown is designed particularly for use in handling cotton, it may also be used in handling other fibrous materials used in the textile industry.

Having thus described my invention, what I desire to claim as new is:

1. In a cotton handling apparatus, the combination of a cotton working machine, automatic means for supplying cotton thereto comprising a conveyor and a gate movable into and out of position to discharge cotton from said conveyor into said machine, automatic mechanism for controlling said gate in accordance with variations in the supply of cotton in the machine, and means for operating said gate to cut off the delivery of cotton to the machine when the machine is stopped.

2. In a cotton handling apparatus, the combination of a cotton working machine, automatic means for supplying cotton thereto, automatic controlling mechanism cooperating with said means to regulate the delivery of cotton to the machine in accordance with its requirements, an automatic stop mechanism for the machine, and connections enabling said stop mechanism to assume control over the delivery of cotton to the machine when the machine stops.

3. In a cotton handling apparatus, the combination of a cotton working machine, automatic means for supplying cotton thereto comprising a conveyor and a gate movable into and out of position to discharge cotton from said conveyor into said machine, power driven mechanism for moving said gate from one of said positions to the other, a feeler mechanism controlling the operative connection between said power driven mechanism and said gate, and additional means operative under predetermined conditions to assume control of said gate.

4. In a cotton handling apparatus, the combination of a cotton working machine, automatic means for supplying cotton thereto comprising a conveyor and a gate movable into and out of position to discharge cotton from said conveyor into said machine, power driven mechanism for moving said gate from one of said positions to the other, a feeler mechanism controlling the operative connection between said power driven mechanism and said gate, an automatic stop mechanism for the machine, and connections for enabling said stop mechanism to operate said gate independently of said feeler mechanism.

5. In a cotton handling apparatus, the combination of a cotton working machine, automatic means for supplying cotton thereto comprising a conveyor and a gate movable into and out of position to discharge cotton from said conveyor into said machine, power driven means for moving said gate from one of said positions to the other including a constantly reciprocating power driven device, a feeler mechanism controlling the operative connection between said device and said gate, an automatic stop mechanism for the machine and connections arranged to be actuated by said stop mechanism for operating said gate to cut off the delivery of cotton to the machine when the machine is stopped and for rendering the connections between said gate and said device temporarily inoperative.

6. In a cotton handling apparatus, the combination of a cotton working machine, a conveyor for carrying cotton to the machine, a gate movable into either an open position where it effects the discharge of cotton from the conveyor into the machine or a closed position where it prevents such discharge, power driven means for moving said gate from one of said positions to the other including a constantly reciprocating segment and a latch arranged to engage said segment, a feeler controlling the operative connection between said latch and said segment, an automatic stop mechanism for the machine, and connections arranged to be actuated by said stop mechanism for closing said gate and shifting the relationship of said latch to said segment.

7. In a cotton handling apparatus, the combination of a cotton working machine, a belt conveyor for carrying cotton to the machine, a gate movable into and out of position to divert cotton from said conveyor into the machine, mechanism for operating said gate to control the delivery of cotton to said machine automatically in accordance with its requirements, and mechanism for automatically moving said gate into position to stop the delivery of cotton to the machine substantially when the machine stops.

8. In a cotton handling apparatus, the combination of a cotton working machine, a belt conveyor for carrying cotton to the machine, a gate movable into either an open position where it is operative to divert cotton from the conveyor into the machine, or to a closed position where it prevents such diversion of the cotton and allows the cotton to travel along the belt, an automatic stop mechanism for the machine, and connections between said mechanism and said gate for closing the gate when the machine stops.

JOHN WILLIAM WOODWARD.